US011164056B2

United States Patent
Qin et al.

(10) Patent No.: US 11,164,056 B2
(45) Date of Patent: Nov. 2, 2021

(54) METHOD AND SYSTEM FOR APPLYING BARCODE, AND SERVER

(71) Applicant: Alibaba Group Holding Limited, Grand Cayman (KY)

(72) Inventors: Yao Qin, Zhejiang (CN); Qimeng Zou, Zhejiang (CN); Nan Xiao, Zhejiang (CN); Linqing Wang, Zhejiang (CN); Jiankang Sun, Zhejiang (CN)

(73) Assignee: Advanced New Technologies Co., Ltd.

( * ) Notice: Subject to any disclaimer, the term of this patent is extended or adjusted under 35 U.S.C. 154(b) by 27 days.

(21) Appl. No.: 16/939,260

(22) Filed: Jul. 27, 2020

(65) Prior Publication Data

US 2020/0356830 A1  Nov. 12, 2020

Related U.S. Application Data

(63) Continuation of application No. PCT/CN2019/074094, filed on Jan. 31, 2019.

(30) Foreign Application Priority Data

Mar. 23, 2018 (CN) .......................... 201810243024.8

(51) Int. Cl.
*G06K 19/06* (2006.01)
*G06K 7/14* (2006.01)
(Continued)

(52) U.S. Cl.
CPC ..... *G06K 19/06028* (2013.01); *G06K 7/1413* (2013.01); *G06Q 20/3276* (2013.01); *H04L 41/0806* (2013.01)

(58) Field of Classification Search
CPC ........... G06K 19/06028; G06K 7/1413; G06K 19/06037; G06K 7/14; G06K 19/20;
(Continued)

(56) References Cited

U.S. PATENT DOCUMENTS

2002/0060246 A1* 5/2002 Gobburu ............. G06Q 20/386
235/462.46
2011/0270751 A1* 11/2011 Csinger .................. G06F 21/40
705/42
(Continued)

FOREIGN PATENT DOCUMENTS

CN          102542235           7/2012
CN          102769619           11/2012
(Continued)

OTHER PUBLICATIONS

Chinese Office Action 1 and English Translation for related CN2018102430248, dated Sep. 25, 2019, 18 pages.
(Continued)

*Primary Examiner* — Thien T Mai
(74) *Attorney, Agent, or Firm* — Faegre Drinker Biddle & Reath LLP

(57) ABSTRACT

The embodiments of the present disclosure provide a method, system and server for utilizing barcode. The method includes: a server receiving a decoding request sent by a user terminal, the decoding request comprising a barcode image associated with a smart device, or a code value of a barcode presented in the barcode image associated with the smart device; the barcode server acquiring state information associated with the code value of the barcode; returning operation information associated with the user if the state information is a second state information; or sending configuration address information to the user terminal for configuring the smart device, and changing the state information associated with the code value, if the state information is a first state information.

11 Claims, 4 Drawing Sheets

Server 600

User terminal 200

Smart device 400

(51) Int. Cl.
*G06Q 20/32* (2012.01)
*H04L 12/24* (2006.01)

(58) Field of Classification Search
CPC ............ G06K 19/06; G06K 19/06018; G06K 7/1408; G06K 7/1417; G06K 7/1421; G06K 7/1426; G06K 7/1447; G06Q 20/326; G06Q 10/1083; G06Q 20/3276; G06Q 20/32; G06Q 20/322; H04L 41/0806
USPC ................ 235/494, 379, 462.13; 705/42
See application file for complete search history.

(56) References Cited

U.S. PATENT DOCUMENTS

| | | | | |
|---|---|---|---|---|
| 2012/0290472 | A1* | 11/2012 | Mullen | G06Q 20/322 |
| | | | | 705/39 |
| 2013/0132218 | A1* | 5/2013 | Aihara | G06Q 20/3276 |
| | | | | 705/21 |
| 2013/0173372 | A1* | 7/2013 | Misra | G06K 7/1408 |
| | | | | 705/14.23 |
| 2017/0046699 | A1* | 2/2017 | Bravo | G06Q 20/3276 |

FOREIGN PATENT DOCUMENTS

| | | |
|---|---|---|
| CN | 105869029 | 8/2016 |
| CN | 106203229 | 12/2016 |
| CN | 106326947 | 1/2017 |
| CN | 106599759 | 4/2017 |
| CN | 107704893 | 2/2018 |
| CN | 108596294 | 9/2018 |
| EP | 3113453 A1 | 1/2017 |

OTHER PUBLICATIONS

Chinese Search Report 1 and English Translation for related CN2018102430248, dated Sep. 25, 2019, 4 pages.
Chinese Office Action 2 and English Translation for related CN2018102430248, dated Jun. 3, 2020, 13 pages.
Chinese Search Report 2 and English Translation for related CN2018102430248, dated Jun. 3, 2020, 4 pages.

* cited by examiner

METHOD AND SYSTEM FOR APPLYING BARCODE, AND SERVER

CROSS-REFERENCE TO RELATED APPLICATIONS

This application is a continuation of International Application No. PCT/CN2019/074094, filed on Jan. 31, 2019, which claims priority to Chinese Patent Application No. 201810243024.8, entitled "Method, system and server for utilizing barcode", filed on Mar. 23, 2018, both of which are hereby incorporated by reference in their entireties.

TECHNICAL FIELD

Embodiments of the present disclosure relate to the technical field of smart voice devices, and in particular to method, system and server for utilizing a barcode.

BACKGROUND

With the development of online payment technology, users can adopt the online payment even when paying in an offline store. For example, payment can be made to a merchant by scanning the merchant's collection barcode. In order for the merchant to acknowledge receipt of the payment, the merchant may be provided with a voice device, which can be associated with the merchant's account, and can broadcast information related to the payment, such as identifier of the payer, the payment amount, etc., when the merchant's account receives the payment from a user.

In the related art, two barcodes are provided on a smart device having a voice broadcast function. One can be used for hardware configuration and account linking of the smart device, and the merchant can perform network information configuration and account linking for the smart device by scanning this barcode. The other one can be used to receive payment, and a consumer user may pay to a merchant's account linked to the smart device by scanning this barcode. In practice, however, displaying these two barcodes on the smart device simultaneously may results in a confusion, in particular, a consumer may scan the barcode for hardware configuration and fail in making a payment, or the merchant may scan the barcode for payment and fail in network configuration of the smart device.

SUMMARY

It is an object of embodiments of the present disclosure to provide a method, system and server for utilizing a barcode, which can avoid confusion brought about by using a plurality of barcodes associated with a smart device, and therefore can improve user experience.

The embodiments of this disclosure are implemented as follows.

Provided is a method for utilizing a barcode, comprising:
  receiving, by a server, a decoding request sent by a terminal of a user, said decoding request including a barcode image associated with a smart device, or a code value of a barcode presented in the barcode image associated with the smart device;
  obtaining, by the server, state information associated with the code value of the barcode;
  returning operation information associated with the user, if the state information is a second state information; or, sending configuration address information to the terminal for configuring the smart device, and changing the state information associated with the code value of the barcode, if the state information is a first state information.

Provided is a system for utilizing a barcode, comprising a user terminal, a smart device and a server, wherein,
  the user terminal is configured to obtain a barcode image associated with the smart device, and send a decoding request including the barcode image or a code value of a barcode presented in the barcode image to the server, the user terminal is further configured to receive operation information associated with the user returned from the server; or, configured to receive configuration address information sent by the server, and configure the smart device according to the configuration address information;
  the smart device is configured to provide the barcode image and broadcast voice message;
  the server is configured to receive a decoding request sent by the user terminal and obtain state information associated with the code value of the barcode, the server is further configured to return operation information associated with the user when the state information associated with the code value of the barcode is a second state information; or, send configuration address information to the terminal for configuring the smart device, and change the state information associated with the code value of the barcode, when the state information associated with the code value of the barcode is a first state information.

Provided is a server including a request receiving module, a state information obtaining module, an information returning module, and a state changing module, wherein,
  the request receiving module is configured to receive a decoding request sent by a user terminal, the decoding request including a barcode image associated with a smart device or a code value of a barcode presented in the barcode image associated with the smart device;
  the state information obtaining module is configured to obtain state information associated with the code value of the barcode, the state information is a first state information or a second state information;
  the information returning module is configured to return operation information associated with the user, when the state information obtained by the state information obtaining module is the second state information; or, configured to send configuration address information to the terminal for configuring the smart device, when the state information acquired by the barcode state information obtaining module is the first state information;
  the state changing module is configured to change the state information associated with the code value of the barcode to the second state information.

As can be seen from the above, in one or more embodiments of the present disclosure, by setting different state information for the code value of a single barcode associated with the smart device, it is possible to apply the barcode to different operations. When the state information associated with the barcode value is the first state information, which indicates that the smart device corresponding to the barcode has not been subjected to an initial configuration, relevant information for configuring the smart device may be returned. When the state information of the barcode is the second state information, which indicates that the smart device corresponding to the barcode has been subjected to the initial configuration, a reset operation information or transaction operation information associated with the user may be returned. The same barcode can be applied to different operations, and different users can perform their respective operations by using the same barcode, thereby the problem of confusion brought about by simultaneous presence of multiple barcodes can be avoided, and the user experience can be improved.

BRIEF DESCRIPTION OF DRAWINGS

In order to describe the technical solutions of the embodiments in the present disclosure or the prior art more clearly, the accompanying drawings for the embodiments or the prior art will be briefly introduced in the following. It is apparent that the accompanying drawings described in the following involve merely some embodiments disclosed in this disclosure, and those skilled in the art can derive other drawings from these accompanying drawings without creative efforts.

DESCRIPTION OF EMBODIMENTS

Embodiments of the present disclosure provide a method, server, and system for utilizing a barcode.

In order to enable those skilled in the art to better understand the technical solutions in the present disclosure, the technical solutions of the embodiments in the present disclosure will be clearly and comprehensively described in the following with reference to the accompanying drawings. It is apparent that the embodiments as described are merely some, rather than all, of the embodiments of the present disclosure. All other embodiments obtained by those skilled in the art based on one or more embodiments described in the present disclosure without creative efforts should fall within the scope of this disclosure.

When a merchant receives payment by using a collection code, a smart voice device may be employed to broadcast the relevant information on the payment once the payment is received. In this way, the merchant can know whether the consumer has completed the payment with the broadcasted voice.

In the related art, two barcodes are provided on a smart voice device. One can be used for hardware configuration and account linking, and the merchant can perform a network configuration and account linking for the smart device by scanning this barcode. The other one can be used to receive payment, and a consumer user may pay to a merchant's account linked to the smart voice device by scanning this barcode. In practice, however, presenting these two barcodes on the smart device simultaneously may results in a confusion. For example, in the case that the merchant wants to perform hardware configuration and account linking but scans the 2D code for receiving payment by mistake, hardware configuration and account linking cannot be performed and it is necessary to scan the 2D code again. On the other hand, if a consumer user wants to perform a payment but scans the 2D code for hardware configuration and account linking by mistake, the user will fail to perform the payment and get a bad experience.

In view of the above, an embodiment of the present disclosure provides a configuration in which the state of the smart device is marked up by setting different state information for the code value of the same barcode, for example, to indicate whether the information configuration has been completed. When the state information for the barcode indicates that the initial configuration has not been performed, the barcode may be used for information configuration of the smart device. On the other hand, when the state information for the barcode indicates that the initial configuration has been performed, the barcode may be used for resetting the configuration information of the smart device by the merchant or for consumer transaction. Thus, the confusion brought out by using a plurality of barcodes can be avoided, and the user experience can be improved.

Figure 1:
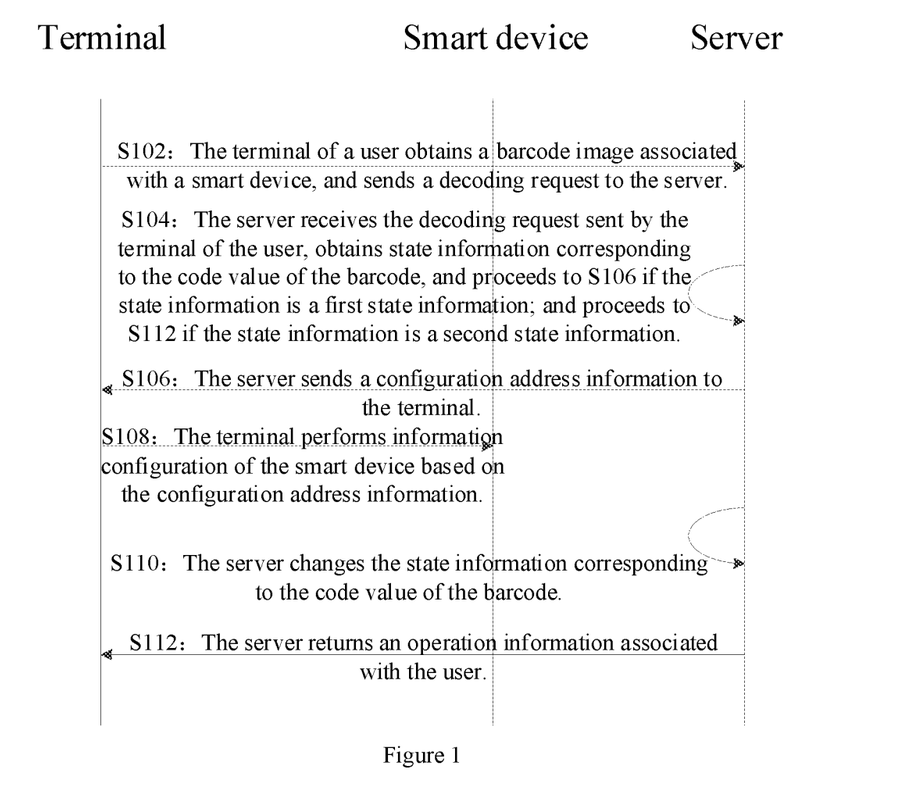
FIG. 1 is a schematic flow chart for an embodiment of the method for utilizing a barcode as provided in this disclosure.

Hereinafter, a specific embodiment of a method for utilizing a barcode provided in the present disclosure will be described. FIG. 1 is a schematic flow chart of a method for utilizing a barcode as provided in an embodiment of this disclosure. It is to be noted that although this disclosure provides operation steps as depicted in the embodiment or flowchart, more or fewer operation steps may be included as necessary without involving creative efforts. The order of the steps as described in the embodiments is merely one of many orders for performing the steps, and rather is not meant to be unique. In practical implementation in a system or an apparatus, the steps can be performed either in the order depicted in the embodiments or the drawings, or be performed in parallel (for example, in an environment of parallel processors or multi-thread processing). In particular, as shown in FIG. 1, the method may comprise the following steps.

S102: The terminal device of the user obtains a barcode image associated with a smart device, and sends a decoding request to a server. The decoding request may include the barcode image or a code value of a barcode included in the barcode image.

The smart device may be a device capable of voice broadcasting. For example, the smart device may be a smart voice box or the like.

The user may be a user who needs to obtain the barcode image and operates accordingly. For example, the user may be a merchant owning the smart device or a consumer who needs to make payment by scanning the barcode.

The smart device may have an associated device identifier. The device identifier may be used to uniquely identify the smart device. The device identifier may specifically be a serial number of the smart device. The barcode image associated with the smart device may have a one-to-one correspondence with the smart device. Specifically, the code value of the barcode may have a one-to-one correspondence with the device identifier of the smart device. The barcode may be a bar code, a 2D code, or the like. Thus, the device identifier of the smart device can be determined from the barcode image presented on the smart device.

The terminal may acquire the barcode image associated with the smart device using a camera device.

After acquiring the barcode image, the terminal may send a decoding request to a server. The decoding request may include the barcode image or a code value of a barcode contained in the barcode image. The code value of the barcode contained in the barcode image may be obtained by parsing the barcode image by the terminal. The code value may be a string of characters.

The decoding request may further include user information of the user.

The user information may include a user identifier. For example, the user information may include the number of the user, user name of the user, a telephone number associated with the user, and the like.

For example, after the merchant scans and acquires the barcode image on the smart device using the terminal for the first time, the merchant may send a decoding request containing the barcode image to the server, or may send to the server a decoding request containing a code value obtained by parsing the barcode image, so as to further perform operations such as configuring the smart device and linking an account number.

S104: the server receives the decoding request sent by the terminal of the user, and obtains the state information associated with the code value of the barcode. If the state information is a first state information, the process proceeds to S106, and if the state information is a second state information, the process proceeds to S112.

The server may receive the decoding request sent from the terminal of the user.

The server may obtain state information of the barcode. The state information may be corresponding to an operation associated with the code value of the barcode. For example, the state information may be corresponding to an initial configuration operation, a reset operation, a transaction operation, and the like. The state information may be a first state information or a second state information. The state information may be a string of characters. For example, the state information may be "0" or "1". Different state information may be corresponding to different operations.

In one embodiment, the operation associated with the code value that is corresponding to the first state information may be an initial configuration operation. The initial configuration operation may involve an initial configuration of the smart device.

The operation associated with the barcode image that is corresponding to the second state information may be a reset operation or a transaction operation. The reset operation may include resetting the configuration of the smart device. The transaction operation may specifically include payment operation or payment receiving operations.

The state information may be stored in the server beforehand. The state information may be readable and changeable. The initial state information associated with the code value of a barcode may be a first state.

S106: The server sends configuration address information to the terminal.

When the state information for the barcode is the first state information, it may indicate that the initial configuration operation is yet to be performed on the smart device.

Then, the server may send configuration address information to the terminal. The configuration address information may be a port address for configuring the smart device. A page for configuring the smart device may be displayed by accessing this port address.

S108: The terminal configures the smart device according to the configuration address information.

The terminal may configure the smart device according to the configuration address information.

The information configuration of the smart device may include configuring network information of the smart device, and/or setting a user account for the smart device, and the like.

S110: The server modifies the state information associated with the code value of the barcode.

Upon completion of the configuration of the smart device, the server may change the state information associated with the code value of the barcode. Specifically, the state information associated with the barcode value may be modified to the second state information.

The state information for the barcode that has changed to the second state information may indicate that the smart device has completed the information configuration.

S112: The server returns the operation information associated with the user.

When the state information for the barcode is the second state information, the state information may indicate that the smart device has completed the initial configuration. Then, the barcode server may determine a category of the user and return operation information associated with the user according to the category of the user. Different operation information can be returned for different categories of users.

A user may be classified into a first category and a second category based on whether the user is associated with the smart device. The first category of users may be users associated with the smart device, and in particular, may be owner of the smart device. For example, the user of the first category may be a merchant owning the smart device. The second category of users may be users that are not associated with the smart device. In particular, they may not be owner of the smart device. For example, they may be consumers.

In one embodiment, the operation information associated with the user may specifically include the reset operation information if the user is a user of the first category, on the other hand, if the user is a user of the second category, the operation information may include transaction operation information.

When the user is a user associated with the smart device, for example, a merchant owning the smart device, the operation information associated with the user may be reset operation information. The reset operation information may be used to reconfigure the smart device. Specifically, the reset operation information may include a port address for resetting the smart device. When the user is a user not associated with the smart device, such as a consumer, the operation information associated with the user may be transaction operation information. The transaction operation information may be used to perform the transaction of the user. In particular, a port address for conducting a transaction may be included. The transaction operation information may be a merchant's collection account.

Figure 2:
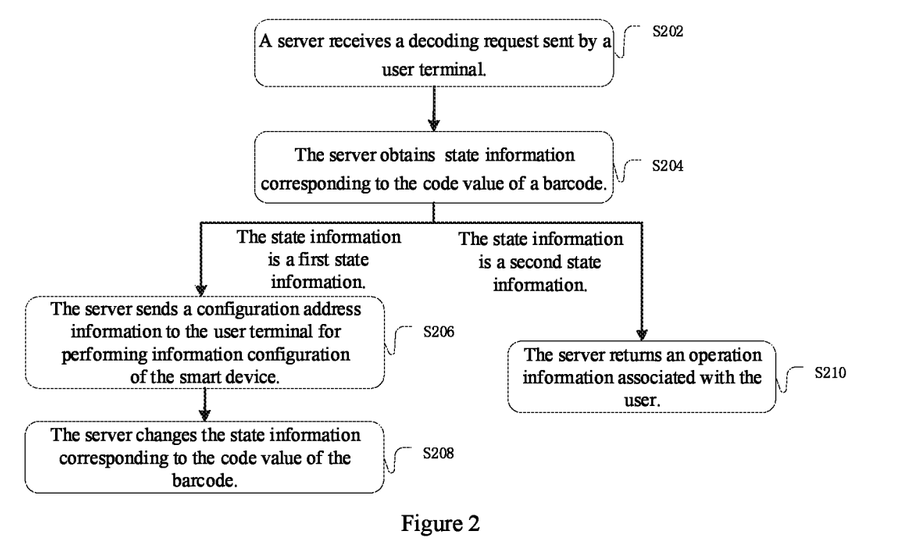
FIG. 2 is a flowchart for one embodiment of the method for utilizing a barcode implemented on server side as provided by the present disclosure.

Based on the method for utilizing a barcode as provided in the above embodiment, the present disclosure also provides an embodiment of the method for utilizing a barcode on server side. FIG. 2 is a flowchart for one embodiment of a method for utilizing a barcode on server side as provided in this disclosure. Referring to FIG. 2, the method may include the following steps.

S202: A server receives a decoding request from a user's terminal.

The decoding request may include a barcode image associated with a smart device or a code value of a barcode presented in the barcode image.

The smart device may have an associated device identifier. The device identifier may be used to uniquely identify the smart device. The device identifier may specifically be a serial number of the smart device.

The barcode image associated with the smart device may have a one-to-one correspondence with the smart device. Specifically, the code value of the barcode may have a one-to-one correspondence with the device identifier of the smart device. The barcode may be a bar code, a 2D code, or the like. The code value may be a string of characters.

The decoding request may further include user information of the user. The user information may include a user identifier, for example, the number of the user, user name of the user, a telephone number associated with the user, and the like.

S204: The server obtains state information associated with the code value of the barcode, and if the state information is the first state information, the process proceeds to S206, if the state information is the second state information, the process proceeds to S210.

The state information may be corresponding to an operation associated with the code value of the barcode. For example, the state information may be corresponding to an initial configuration operation, a reset operation, a transaction operation, and the like.

The state information may be a first state information or a second state information. The state information may be a string of characters. For example, the state information may be "0" or "1." Different state information may correspond to different operations.

In one embodiment, the operation associated with the code value that is corresponding to the first state information may be an initial configuration operation. The initial configuration operation may be used to perform an initial configuration operation of the smart device.

The operation associated with the barcode that is corresponding to the second state information may be a reset operation or a transaction operation. The reset operation may include resetting the configuration of the smart device. The transaction operation may specifically include payment operation or payment receiving operation.

The state information may be stored in the server beforehand. The state information may be readable and changeable. The initial state information associated with the code value of a barcode may be the first state.

S206: The server sends configuration address information to the terminal for configuring the smart device.

S208: The server changes the state information associated with the code value of the barcode.

Specifically, the state information associated with the code value of the barcode may be changed to the second state information.

S210: The server returns the operation information associated with the user.

The barcode server may determine a category of the user and return the operation information associated with the user according to the category of the user. Different operation information can be returned for different categories of users.

The user may be classified into a first category and a second category based on whether the user is associated with the smart device. The first category of users may be users associated with the smart device. In particular, they may be owner of the smart device. The second category of users may be users that are not associated with the smart device. In particular, they may not be owner of the smart device.

In one embodiment, the operation information associated with the user may specifically include the reset operation information if the user is of the first category, or may include the transaction operation information if the user is of the second category.

Thus, in one or more embodiments of the method for utilizing a barcode in this disclosure, by setting different state information for the code value of a single barcode associated with the smart device, the barcode can be applied to different operations. When the state information associated with the barcode value is the first state information, which indicates that the smart device corresponding to the barcode is yet to be initially configured, relevant information for configuring the smart device may be returned. On the other hand, when the state information associated with the code value is the second state information, which indicates that the smart device corresponding to the barcode has completed the initial configuration, the reset operation information or transaction operation information associated with the user can be returned. In the embodiment of the method for utilizing a barcode as provided in the present disclosure, the same barcode can be applied to different operations, and different users can perform their respective operations by using the same barcode. Therefore, the confusion caused by simultaneous use of multiple barcodes is avoided, and the user experience is improved.

Based on the methods for utilizing a barcode described above, the present disclosure also provides a system and a barcode server. The system and barcode server may include an apparatus comprising a system (including a distributed system), software (application), module, component, device, etc., that implements the method described in the embodiments of the present disclosure, in conjunction with necessary hardware. Based on the same inventive concept, the system and barcode server are provided in this disclosure as described in the following embodiments. Because the technical solutions of the system and barcode server are similar to that of the method, for specific implementations of the system and server in the present disclosure, reference can be made to implementation of the method mentioned above, and excessive details are omitted here. Although the apparatus described in the following embodiments is preferably implemented as software, implementation of hardware or a combination of software and hardware may also be conceived.

Figure 3:
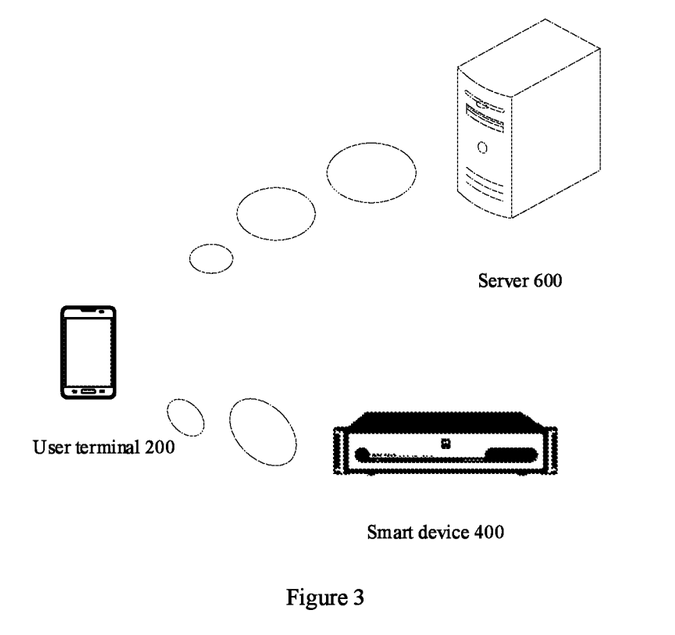
FIG. 3 is a schematic structural diagram for an embodiment of the system for utilizing a barcode as provided in this disclosure.

FIG. 3 is a schematic structural diagram for one embodiment of a system for utilizing a barcode as provided in this disclosure, and as shown in FIG. 3, the system may include a user terminal 200, a smart device 400, and a barcode server 600.

The user terminal 200 may be configured to acquire a barcode image associated with the smart device 400, and send to the server 600 a decoding request which includes the barcode image or a code value of the barcode presented in the barcode image. The user terminal 200 may be further configured to receive operation information associated with the user returned from the server 600, or, may be configured to receive configuration address information sent by the server 600, and configure the smart device according to the configuration address information.

The smart device 400 may provide the barcode image and provide a voice broadcast.

The server 600 may be configured to receive a decoding request from the user terminal 200 and obtain state information associated with a code value of the barcode. The server 600 is further configured to return the operation information associated with the user when the state information for the barcode is the second state information, alternatively, to send the configuration address information to the user terminal 200 for information configuration of the smart device 400, and change the state information associated with the code value of the barcode, when the state information for the barcode is the first state information.

Figure 4:
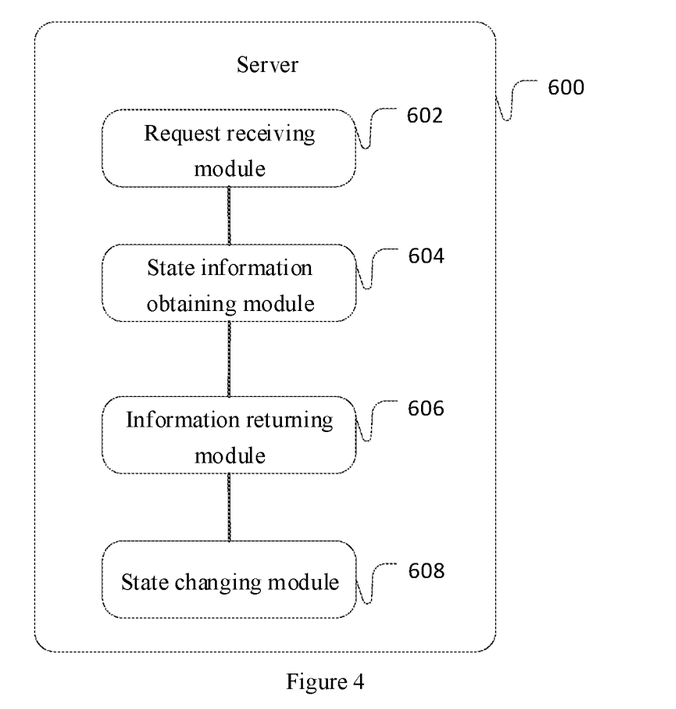
FIG. 4 is a schematic structural diagram for one embodiment of the server for utilizing a barcode as provided in the present disclosure.

The present disclosure further provides a server for utilizing a barcode, FIG. 4 is a schematic structural diagram for an embodiment of the server for utilizing a barcode as provided in the present disclosure. As shown in FIG. 4, the server 600 may include a request receiving module 602, a state information obtaining module 604, an information returning module 606, and a state changing module 608.

The request receiving module 602 may be configured to receive a decoding request sent from a user terminal. The decoding request may include a barcode image associated with the smart device or a code value of a barcode presented in the barcode image associated with the smart device. The decoding request may further include user information of the user.

The state information obtaining module 604 may be configured to obtain state information associated with the code value of the barcode. The state information may be the first state information or the second state information.

The information returning module 606 may be configured to return the operation information associated with the user when the state information obtained by the state information acquiring module 604 is the second state information; or, send configuration address information to the user terminal for configuring the smart device when the state information obtained by the state information acquiring module 604 is the first state information.

The state changing module 608 may be configured to change the state information associated with the code value of the barcode to the second state information.

Figure 5:
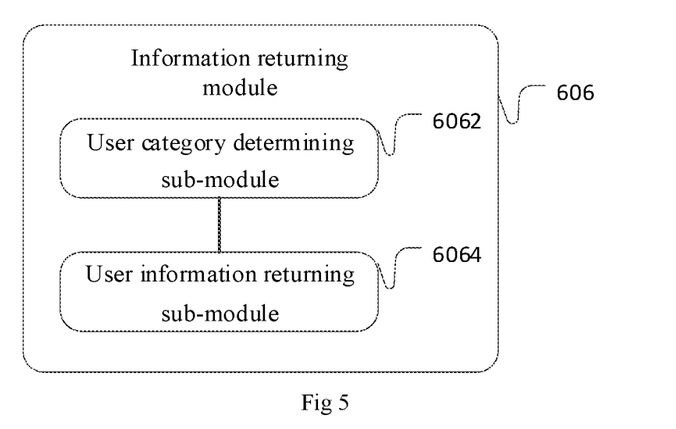
FIG. 5 is a schematic diagram of the information returning module in the server embodiment as provided in this disclosure.

FIG. 5 is a schematic diagram of the information returning module in the server provided in this disclosure. When the state information obtained by the state information obtaining module is the second state information, referring to FIG. 5, the information returning module 606 may include a user category determining sub-module 6062 and a user information returning sub-module 6064.

The user category determining sub-module 6062 may be configured to determine a category of the user. The category of the user may include a first category and a second category. The first category may include users that are associated with the smart device. The second category may include users that are not associated with the smart device.

The user information returning sub-module 6064 may be configured to return the operation information corresponding to the user's category. The operation information corresponding to a user's category may include reset operation information corresponding to a user of a first category or transaction operation information corresponding to a user of a second category.

Figure 6:
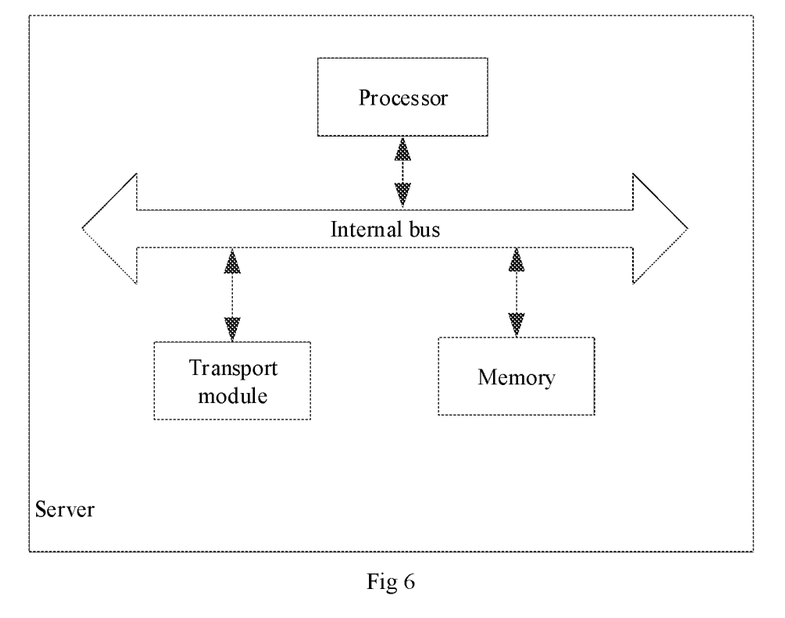
FIG. 6 is a schematic structural diagram of a server according to an exemplary embodiment of the present disclosure.

The above method or server for utilizing a barcode as provided in the embodiments of this disclosure may be implemented by a processor executing corresponding program instructions in a computer, for example, may be implemented in a PC end by using a C++ language in a Windows operating system, or implemented by using a corresponding application design language in another system such as Linux, Android, and iOS in combination with necessary hardware, or implemented based on the processing logic of a quantum computer. As shown in FIG. 6, FIG. 6 is a schematic block diagram of a server according to an exemplary embodiment of the present disclosure. At the hardware level, the server may include a processor, an internal bus, a transport module, and a memory. The memory may include memory as well as non-volatile memory. The processor reads the computer program from the non-volatile memory into the memory and then runs the program to form the server at a logical level. Those ordinarily skilled in the art will appreciate that the structure shown in FIG. 6 is merely schematic and does not limit the structure of the server described above. For example, the server may include more or fewer components than those shown in FIG. 6, and for example, may include other processing hardware, such as a GPU (Graphics Processing Unit), or have a different configuration than that shown in FIG. 6. Of course, in addition to a software implementation, the present disclosure does not exclude other implementations, such as a logic device or a combination of hardware and software. In other words, the entities performing the processes are not limited to logic units, and may also be hardware or logic devices.

In particular, another aspect of the present disclosure further provides a server comprising a processor and a memory storing computer program instructions executed by the processor, the following steps will be implemented when the processor executes the computer program instructions:

The server receives a decoding request sent by a user terminal, the decoding request including user information and a barcode image associated with a smart device;

obtaining, by the server, state information corresponding to a code value of the barcode;

returning, if the state information is the second state information, operation information associated with the user; or, sending configuration address information to the terminal for configuring the smart device and changing the state information associated with the code value of the barcode, if the state information is first state information.

In the embodiments of the disclosure, the processor may include a central processing unit (CPU) or a graphics processor (GPU), and may further include other devices capable of logic processing, such as single-chip microcomputers, logic gates, integrated circuits, and the like, or suitable combinations thereof. The memory in the embodiments of the present application may be a memory device for storing information. In a digital system, the memory may be a device capable of storing binary data, in an integrated circuit, the memory may be a circuit having a storage function without a physical form, such as RAM, FIFO, or the like, and in a system, the memory may be a storage device having a physical form. In implementation, the memory may also be implemented as cloud memory. There is no limitation to specific implementation of the memory in this disclosure.

As can be seen, the embodiments of the system and the server for utilizing a barcode as provided in this disclosure are based on the same inventive concept as the method embodiments in this disclosure, and therefore, embodiments of the system and server for utilizing a barcode as provided in this disclosure may achieve the same technical effects as that of the method embodiments in the disclosure.

Specific embodiments of the present disclosure have been described above. Other embodiments will fall within the scope of the appended claims. Under some circumstances, the actions or steps described in the claims may be performed in an order different from that in the embodiments and still can achieve a desired result. In addition, the processes depicted in the accompanying drawings are unnecessarily in the shown order or consecutive order to achieve the desired result. In some embodiments, multitask processing and parallel processing are also possible or may be advantageous.

In the 1990s, it is easy to tell whether a technical improvement is a hardware improvement (for example, an improvement to a circuit structure such as a diode, a transistor, a switch, etc.), or a software improvement (an improvement to a methodical process). However, with the development of technologies, many improvements to methodical processes nowadays can be regarded as improvements to the hardware circuit structures. Basically, all improved methodical processes can be programmed into a hardware circuit to obtain corresponding hardware circuit structures. Therefore, it cannot be ruled out to implement an improvement to a methodical process with a physical hardware module. For example, a Programmable Logic Device (PLD) (e.g., Field Programmable Gate Array (FPGA)) is an integrated circuit of which logical functions are determined by user's programming of the device. The designer programs by himself to "integrate" a digital system into a piece of PLD, without needing to design and manufacture the ASIC chip by a chip manufacturer. Moreover, at present, instead of manually manufacturing the integrated circuit chips, such programming is mostly implemented by using software "logic compiler", which is similar to the software compiler used for program development, and the source codes to be compiled should be written in a specific programming language referred to as Hardware Description Language (HDL). There are many kinds of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and currently the most commonly used is Very-High-Speed Integrated Circuit Hardware Description Language (VHDL) and Verilog. It is comprehensible to those skilled in the art that a hardware circuit that implements a methodical process can be easily obtained by adequately programming the methodical process into an integrated circuit with the aforementioned hardware Description languages.

The controller may be implemented in any suitable way. For example, the controller may take the form of, for instance, a microprocessor or processor, and a computer readable medium storing computer readable program codes (e.g., software or firmware) executable by the (micro) processor, a logic gate, a switch, an application-specific integrated circuit (ASIC), a programmable logic controller, and an embedded microcontroller. Examples of the controller include, but not limited to, the microcontrollers such as ARC 625D, Atmel AT91SAM, Microchip PIC18F26K20, and Silicone Labs C8051F320. A memory controller may also be implemented as a part of control logic of the memory. As known to those skilled in the art, in addition to implementing the controller in the form of the pure computer readable program codes, it is definitely possible to embody the method in a program to enable a controller to implement the same functionalities in the form of such as a logic gate, a switch, an application-specific integrated circuit, a programmable logic controller, or an embedded microcontroller. Thus, such a controller may be regarded as a hardware component, while means included therein for implementing respective functions may be regarded as parts in the hardware component. Furthermore, the means for implementing respective functions may be regarded as both software modules that implement the method and parts in the hardware component.

The apparatus, modules or units described in the foregoing embodiments can be implemented by a computer chip or entity, or implemented by a product having a specific function. A typical device implementation is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, an apparatus is broken down into units by functionalities to be described respectively. However, in practical implementation, the function of one unit may be implemented in a plurality of software and/or hardware entities, or vice versa, the functions of a plurality of units may be implemented in a single software and/or hardware entity.

The present invention has been described with reference to flowcharts and/or block diagrams of the method, device (apparatus) and computer program product of the embodiments in this disclosure. It should be understood that each process and/or block in the flowcharts and/or block diagrams and combinations of processes and/or blocks in the flowcharts and/or block diagrams can be implemented by computer program instructions. The computer program instructions may be provided to a general-purpose computer, a special-purpose computer, an embedded processor or a processor of other programmable data processing devices to form a machine, so that instructions executed by the computer or the processor of other programmable data processing devices form an apparatus configured to implement functions designated in one or more processes in a flowchart and/or one or more blocks in a block diagram.

The computer program instructions may also be stored in a computer readable memory which can guide the computer or other programmable data processing devices to operate in a specific manner, so that the instruction stored in the computer readable memory forms an article of manufacture comprising therein an instructing device, which implements functions designated in one or more processes in a flowchart and/or one or more blocks in a block diagram.

The computer program instructions may also be loaded onto a computer or other programmable data processing devices, so that a series of operational steps are performed on the computer or other programmable devices to form a computer implemented process, and therefore, the instructions executed in the computer or other programmable devices provide steps for implementing functions designated in one or more processes in a flowchart and/or one or more blocks in a block diagram.

In a typical configuration, the computing device includes one or more central processing units (CPUs), an input/output interface, a network interface, and a memory.

The memory may include computer readable medium such as a volatile memory, a Random-Access Memory (RAM), and/or non-volatile memory, e.g., a Read-Only Memory (ROM) or a flash RAM. The memory is an example of a computer readable medium.

The computer readable medium includes non-volatile and volatile medium as well as removable and non-removable medium, and can implement information storage by any method or technology. The information can be a computer readable instruction, a data structure, a program module or other data. An example of the storage medium of a computer includes, but is not limited to, a phase change memory (PRAM), a static random access memory (SRAM), a dynamic random access memory (DRAM), other types of RAM, a ROM, an electrically erasable programmable read-only memory (EEPROM), a flash memory or other memory technologies, a compact disk read-only memory (CD-ROM), a digital versatile disc (DVD) or other optical storage devices, a cassette tape, a magnetic tape/magnetic disk storage device, a graphene storage device or other magnetic storage devices, or any other non-transmission medium, and can be used to store information accessible to the computing device. According to the definition in this context, the computer readable medium does not include transitory media, such as a modulated data signal and a carrier wave.

It is to be comprehended that, the terms "comprise", "include" or any other variant thereof do not mean to be exclusive in that a process, a method, a product or a device comprising or including a number of elements may comprise or include not only those elements, but also other elements not explicitly listed, or may further comprise or include elements inherent to such process, method, product or device. It is not excluded that a process, method, product or device comprising an element may further comprise other elements, if not specifically prescribed.

Those skilled in the art should understand that the embodiments of the present disclosure can be provided as a method, a device, or a computer program product. Therefore, the embodiments of the present disclosure may be implemented in a form of an absolute hardware embodiment, an absolute software embodiment, or an embodiment combining software and hardware. Moreover, the embodiments of the present disclosure can be in the form of a computer program product implemented on one or more computer usable storage medium (including, but not limited to, a magnetic disk memory, a CD-ROM, an optical memory and the like) including computer program codes.

The present disclosure can be described in a general context of a computer executable instruction executed by a computer, for example, a program module. Generally, the program module may include a routine, a program, an object, a component, a data structure, and the like for performing a specific task or implementing a specific abstract data type. The present disclosure may also be implemented in a distributed computing environment. In the distributed computing environment, a task is performed by remote processing devices connected via a communication network. Further, in the distributed computing environment, the program module may be located in local and remote computer storage medium including a storage device.

The embodiments in the present disclosure are described in a progressive manner, which means descriptions of each embodiment are focused on the differences from other embodiments, and the descriptions of the same or similar aspects of the embodiments are applicable to each other. In particular, for the embodiments involving apparatus and server, of which essence is analogous to that of the method embodiments, reference can be made to the method embodiments, and detailed descriptions may be omitted.

The above descriptions involve merely some embodiments of the present disclosure, and are not intended to limit the present disclosure. Various modifications and variations may be made to the embodiments of the present disclosure by those skilled in the art. Any modifications, equivalents, improvements, and the like made within the spirit and principle of the present disclosure shall fall within the scope of the appended claims.

What is claimed is:

1. A method for utilizing a barcode, comprising:
receiving, by a server, a decoding request sent by a terminal of a user, said decoding request including a barcode image associated with a smart device, or a code value of a barcode presented in the barcode image associated with the smart device;
obtaining, by said server, state information associated with the code value of said barcode;
returning operation information associated with said user if said state information is a second state information; or,
sending configuration address information to said terminal for configuring said smart device, and changing the state information associated with the code value of said barcode, if said state information is a first state information,
wherein the operation information associated with said user comprises operation information corresponding to a user category, and
wherein said user category comprises a first category and a second category, users of said first category include users that are associated with said smart device, and users of said second category include users that are not associated with said smart device.

2. The method according to claim 1, wherein the code value of the barcode presented in said barcode image has a one-to-one correspondence with said smart device.

3. The method according to claim 1, wherein said state information is corresponding to an operation associated with the code value.

4. The method according to claim 3, wherein the state information is stored in said server beforehand and is readable and changeable.

5. The method according to claim 3, wherein said state information is a string of characters.

6. The method according to claim 3, wherein
the operation associated with the code value that is corresponding to said state information includes an initial configuration operation, when said state information is the first state information; or,
the operation associated with the code value that is corresponding to said state information includes a reset operation or a transaction operation, when said state information is the second state information.

7. The method according to claim 1, wherein said operation information associated with said user comprises:
reset operation information, if said user is a user of the first category; or,
transaction operation information, if said user is a user of the second category.

8. The method according to claim 1, wherein changing the state information associated with the code value of said barcode comprises changing the state information associated with the code value of said barcode to the second state information.

9. A system for utilizing a barcode, comprising a user terminal, a smart device and a server, wherein,
said user terminal is configured to obtain a barcode image associated with said smart device, and send a decoding request including said barcode image or a code value of a barcode presented in said barcode image to said server, said user terminal is further configured to receive operation information associated with said user returned by said server, or to receive configuration address information sent by said server, and configure said smart device based on said configuration address information;

said smart device is configured to provide said barcode image and broadcast voice message;

said server is configured to
receive the decoding request sent by said user terminal;
obtain state information associated with the code value of said barcode;
said server is further configured to return operation information associated with said user when the state information associated with the code value of said barcode is a second state information, or to send configuration address information to said user terminal for configuring said smart device and change the state information associated with the code value when said state information associated with the code value is a first state information,
wherein the operation information associated with said user comprises operation information corresponding to a user category, and
wherein said user category comprises a first category and a second category, users of said first category include users that are associated with said smart device, and users of said second category include users that are not associated with said smart device.

10. A server comprising a request receiving module, a state information obtaining module, an information returning module and a state changing module, wherein,
said request receiving module is configured to receive a decoding request sent by a user terminal, said decoding request including a barcode image associated with a smart device or a code value of a barcode presented in the barcode image associated with the smart device;
said state information obtaining module is configured to obtain state information associated with the code value of said barcode, said state information being a first state information or a second state information;
said information returning module is configured to return an operation information associated with said user when the state information obtained by said state information obtaining module is the second state information, or to send a configuration address information to said user terminal for configuring said smart device when the state information obtained by said barcode state information obtaining module is the first state information;
said state changing module is configured to change the state information associated with the code value to the second state information,
wherein the operation information associated with said user comprises operation information corresponding to a user category, and
wherein said user category comprises a first category and a second category, users of said first category include users that are associated with said smart device, and users of said second category include users that are not associated with said smart device.

11. The server according to claim 10, wherein said information returning module comprises a user category determining sub-module and a user information returning sub-module when the state information obtained by said state information obtaining module is the second state information,
said user category determining sub-module is configured to determine a category of said user, the category comprising a first category or a second category,
said user information returning sub-module is configured to return an operation information corresponding to the category of the user, wherein the operation information corresponding to the category of the user includes reset operation information corresponding to users of the first category, or transaction operation information corresponding to users of the second category,
the users of the first category comprise users that are associated with said smart device, and the users of said second category include users that are not associated with said smart device.

* * * * *